United States Patent [19]

Backe et al.

[11] Patent Number: 4,658,859
[45] Date of Patent: Apr. 21, 1987

[54] VALVE SPOOL WITH CROSS DRILL PORTS

[75] Inventors: Bengt S. Backe, Dundee; LaMoyne W. Durham, Bartlet, both of Ill.

[73] Assignee: South Bend Lathe, Inc., South Bend, Ind.

[21] Appl. No.: 679,212

[22] Filed: Dec. 7, 1984

[51] Int. Cl.⁴ ............... F16K 39/06; F16K 11/085
[52] U.S. Cl. ................. 137/625.23; 137/625.22; 137/625.47; 251/283
[58] Field of Search ............... 137/625.22, 625.23, 137/625.43, 625.46, 625.47; 251/283

[56] References Cited
U.S. PATENT DOCUMENTS

| | | |
|---|---|---|
| 1,342,900 | 6/1920 | McGillivray . |
| 1,657,841 | 1/1928 | Peris ........................ 251/283 |
| 1,796,808 | 3/1931 | Roberts . |
| 2,182,459 | 12/1939 | Vickers . |
| 2,229,933 | 1/1941 | Parker . |
| 2,313,257 | 3/1943 | Nelson . |
| 2,745,434 | 5/1956 | Stevenson . |
| 2,749,941 | 6/1956 | Gardner . |
| 2,938,544 | 5/1960 | Simpson . |
| 3,199,539 | 8/1965 | Leathem . |
| 3,430,919 | 3/1969 | Frazier . |
| 3,774,634 | 11/1973 | Bonney . |
| 3,814,378 | 6/1974 | Wurzburger . |

Primary Examiner—Martin P. Schwadron
Assistant Examiner—John S. Starsiak, Jr.
Attorney, Agent, or Firm—Barnes & Thornburg

[57] ABSTRACT

A four-way valve is provided, for selectively interconnecting pressure supply and return lines with control pressure lines of a hydraulic device, having means for independently balancing the valve against pressures exerted on the valve by any one or more of the pressure lines and at any operating position of the valve. These pressures exerted on the valve would otherwise restrict or prevent actuation of that valve. This balancing means exposes a minimum surface area of the valve to high pressure forces and isolates the fluid pressure in the pressure lines until interconnection is made by valve actuation.

9 Claims, 9 Drawing Figures

VALVE SPOOL WITH CROSS DRILL PORTS

BACKGROUND AND SUMMARY OF THE INVENTION

The present invention relates generally to hydraulic valves and, more particularly, to balanced four-way valves for controlling hydraulic devices.

Hydraulic circuits are known to include valve members which control the application of fluid pressure from a pressure supply line to a plurality of control lines for actuating a hydraulic implement, tool, or device. For example, in lathes and other machine tools, such valve members control the pressure flow between directional control lines for adjusting work supports. In particular, a four-way valve may be mounted between a pressure supply or input line, a pressure return or output line, and left and right pressure control lines. These control lines determine the position of a work support along a typically linear path. The valve member is positionable between left, right and neutral locations. In the left location, the valve member permits pressure flow between the input line and the left control line and pressure flow between the right control line and the output line. In the right location, the valve member permits pressure flow between the input line and the right control line and pressure flow between the left control line and the output line. In the neutral location, the valve member shuts off flow from the input line entirely. Ideally, in the neutral location the valve member would also shut off flow to and from the control lines and output line, thus maintaining the work support at its last adjusted position.

The valve members in such hydraulic circuits have often been spool valves requiring linear motion to actuate between various positions. A significant amount of space along the linear direction of valve motion has typically been required to provide the requisite number of interconnections between pressure lines. Further, such valves have required considerable machining to produce, especially where the level or amount of pressure flow is also to be controlled by the valve member.

Rotary spool or servo valves are available which reduce or eliminate entirely the necessity for linear motion. However, rotary valves typically require a large angle of rotation to switch between all requisite pressure line connections and/or considerable machining of the valve chamber and the valve member itself. Large angles of rotation are particularly undesirable where the valve member is controlled by direct connection to a precision stepping motor, as in a CNC lathe. Excessive machining is undesirable since it increases production costs and assembly time. Some relatively inexpensive rotary servo valve arrangements are known, but these are often merely bi-stable and will not serve to control the amount of pressure flow as well as its direction. Further, a major concern with respect to rotary valves is that pressure imbalances with respect to one or more of the connection lines may cause the valve member to jam against its seat or the valve chamber.

Such pressure imbalances may arise from a variety of sources. With respect to the input line, the supply pressure is often greater than the return pressure or the pressure in the control lines, especially if the valve member has been in its neutral location and there is some leakage from the control lines. This high supply pressure is exposed to a portion of the valve member at the connection between the pressure lines and, thus, forces it against a portion of the valve seat or the valve chamber opposite that exposed portion. It has been suggested to split the passageway through the valve housing from the supply pressure line and provide supply pressure ports on opposing sides of the valve member so as to balance these high supply pressure forces. However, this arrangement significantly increases production costs and complicates the pressure line connection orientation required for the valve member.

Even if the valve member is balanced against supply pressure from the input line, pressure imbalances from either or both of the control pressure lines may detrimentally affect the valve member. The fluid pressure from these lines also acts on an exposed portion of the valve member at the pressure lines connection to force the valve member off center and against the valve seat or valve chamber. High pressures in the control lines can be transitory or sustained and may result where the control lines have been previously charged by the input line with little or no leakage since then or where the control lines are continuously subject to a charge from, for example, connection to a pressure accumulator. To some extent, the effect of control line pressure on the valve member can be balanced by positioning the left and right control pressure line ports to the valve member on opposing surfaces of the valve member. However, the pressure in each control pressure line is not always equal, nor does it always remain constant.

Further, the output line can also exert undesirable pressure on the valve member. High pressures in the return line can result where the hydraulic circuit includes other independently operable devices having a common return line with the valve member. As these other devices are employed, the return line can, at least momentarily, be exposed to output pressures which exceed even the input line pressure and the control line pressures. These high pressures are also exposed to a portion of the valve member and can, thus, force the valve member off center.

Forcing the valve member off center causes increased wear on the valve seat and decreases its useful lifetime. Further, when the valve member is jammed off center, increased torque is required to actuate the valve. This presents a problem particularly where it is desirable to employ a precision stepping motor to control valve position. Higher torque motors are more expensive, and variations in the required torque (as where pressure imbalances vary) can introduce significant errors in precision control of the valve.

Pressure imbalances can occur at any time and at any valve position in the hydraulic circuit. Prior valve systems have often focussed on pressure imbalances occurring when the valve member is in the neutral location and where excess pressure is caused by input line pressure. However, as discussed above, any of the other pressure lines can also cause significant imbalances even at the neutral valve location. Further, pressure imbalances can also occur when the valve member is in the left or right open locations as well as at various stages of these locations (corresponding to control of the amount of fluid flow in each direction). To the extent that there is leakage past the valve seals to the axial ends of the valve member, there can also be pressure imbalances which exert an axial force on the valve member.

Balanced rotary valves have generally been known and, in some applications, have been reasonably successful. These balanced valves typically permit selective interconnection between two or three pressure lines and compensate for inlet line pressure exerted on the valve member. Again, however, pressure imbalances can result from high pressure levels in any of the pressure lines, not just the inlet line. Further, valve constructions which are suitable in specialized two and three-way valve members are often not readily applicable or commercially feasible for mass produced four-way valves. This is especially the case where the pressure line connections are not coplanar within the valve member, but are instead axially displaced (requiring longer valve member dimensions) along the valve. Such arrangements inhibit compact valve design and increase production and assembly costs.

Various four-way balanced valves have been suggested, but these also typically have complicated constructions. For example, pressure line connections are often made through torturous flow paths within the valve member, some of which involve fluid flow constrictions. Also, the valve member may not be capable of isolating the pressures within each of the pressure lines when in the neutral location. This permits undesirable equalization of fluid pressure within the control lines and/or drainage of control line pressure through the return line.

Typically, these valves include cuts or recesses in the valve member, even at the ports to the pressure lines, which increase valve exposure to high pressures with the attendant deterioration of valve sealing integrity. On occasion, balancing has been accomplished merely by draining the excess pressure to the return line or opposing pressure lines, although this results in decreased circuit efficiency.

Prior balanced valves have typically been tapered spool valves. However, these arrangements are more difficult to manufacture and have also required axial balancing since tapered spools tend to be self-locking at one end. Additional mechanical devices, such as springs, have been employed to maintain free valve movement in such tapered valves.

It is therefore an object of the present invention to provide an improved balanced valve for use in hydraulic circuits.

Another object is the provision of a four-way valve which is balanced at any valve location and with respect to pressure from any connecting line.

A further object is to provide a balanced valve which is compact, requires minimal machining, and is commercially feasible to mass produce.

Yet another object is the provision of a balanced rotary valve requiring minimal actuation torque and a small angle of rotation to move between each pressure line connection position.

Still another object is to provide a balanced four-way valve maintaining pressure line isolation at the neutral valve location and minimizing valve member exposure to fluid pressures.

Yet still another object is the provision of an inexpensive four-way valve having hydraulic balancing of the radial valve location, at both open and closed pressure line connection positions, as well as of the axial valve location.

These and other objects of the present invention are attained in the provision of a four-way valve, for selectively interconnecting pressure supply and return lines with control pressure lines of a hydraulic device, having means for independently balancing the valve against pressures exerted on the valve by any one or more of the pressure lines and at any operating position of the valve. These pressures exerted on the valve would otherwise wise restrict or prevent actuation of that valve. This balancing means exposes a minimum surface area of the valve to high pressure forces and isolates the fluid pressure in the pressure lines until interconnection is made by valve actuation.

The valve interconnects the pressure lines by alignment with passages through the valve body. In the neutral position, each pressure line is isolated from the others and independently balanced to prevent the valve body from being jammed against the valve seat or a wall of the valve chamber. In either of the connecting positions, input pressure is supplied to one of the control pressure lines and the other control pressure line is connected to the return line. However, each pair of pressure lines remains isolated from the other pair of pressure lines, and the valve body is independently balanced with respect to pressure forces exerted by each such pair.

The pressure line ports to the valve chamber are coplanar with respect to each other and the passages through the valve body. Valve balancing is achieved in a compact and unexpensive manner through the use of diagonal cross ports drilled through the valve body at each pressure line port. These cross ports permit pressures applied at the pressure line ports to also be applied at other portions of the valve so as to oppose and neutralize the imbalancing forces on the valve body.

Other objects, advantages and novel features of the present invention will become apparent from the following description of the preferred embodiments when taken in conjunction with the accompanying drawings.

DESCRIPTION OF THE PREFERRED EMBODIMENTS

Figure 1:
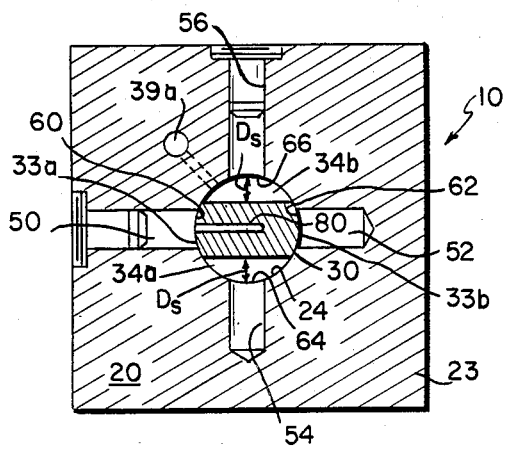
FIG. 1 shows a cross-sectional top view of a balanced four-way valve in a neutral position according to the principles of the present invention.

FIG. 1, which illustrates a preferred embodiment of the present invention, shows a cross-sectional view of balanced four-way valve 10, including valve housing 20 and rotary valve member 30. Valve 10 is, for example, connected in a hydraulic circuit (not shown) having a source of fluid supply pressure, a reservoir of hydraulic fluid, and a tool or implement actuated by the application of hydraulic pressure thereto. This tool or implement may, for example, be the work support for a lathe or machine tool wherein the application of pressure on one side thereof causes the work support to move in a given direction and the application of pressure on another side thereof causes the work support to move in a different direction. In such a circuit, valve 10 could control the direction of pressure to the work support.

Figure 2:
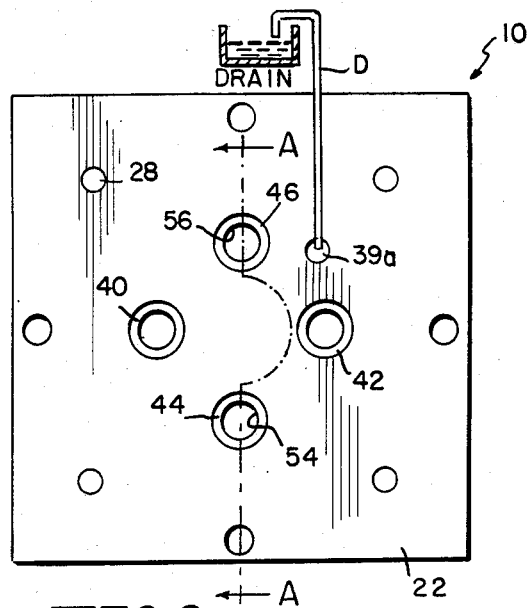
FIG. 2 shows a top plan view of the balanced four-way valve of FIG. 1.

More specifically, as shown in FIG. 2, valve housing 20 includes a top surface 22 having connections at 40, 42, 44 and 46 to a supply pressure or input line from the pressure source, a return pressure or output line to the fluid reservoir, and first and second control pressure lines for actuating the hydraulic implement, respectively. From these connections, valve 10 includes generally L-shaped passageways 50, 52, 54 and 56 to valve chamber 24. Passageway 50 provides supply pressure at port 60 in valve chamber 24. Passageway 52 provides return pressure at port 62 in valve chamber 24. Passageways 54 and 56 provide control pressure at ports 64 and 66, respectively, in valve chamber 24.

Figure 3:
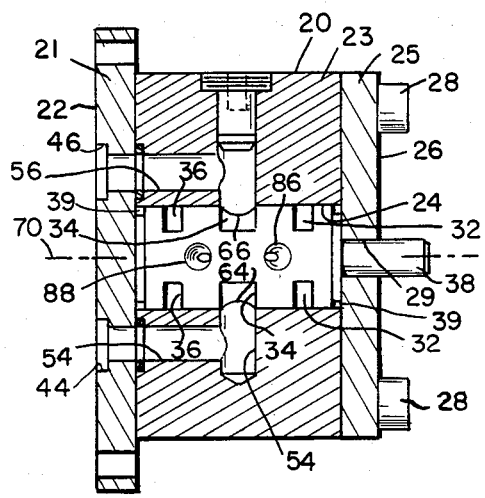
FIG. 3 shows a cross-sectional side view taken along line A—A of the balanced four-way valve of FIG. 2.
Figure 4:
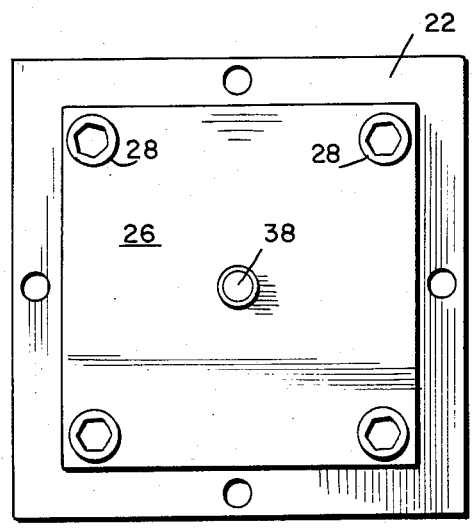
FIG. 4 shows a bottom plan view of the balanced four-way valve of FIG. 1.

As shown more clearly in FIG. 3, in preferred embodiments of the present invention, valve housing 20 is formed from top plate 21, central plate 23, and bottom plate 25. This construction permits economical and efficient mass production of valve 10 by reducing the amount of casting and machining necessary. The valve housing is, for example, formed with all necessary passageways by linear drilling techniques alone. Valve chamber 24 is formed by drilling completely through the core of central plate 23. L-shaped passageways 50, 52, 54 and 56 are each formed by the intersection of a lateral drill bore from the side surface of central plate 23 through valve chamber 24 with a longitudinal drill bore extending from the top surface of central plate 23. Plates 21, 23 and 25 of valve housing 20 are secured together by lockings screws or bolts 28. Of course, it will now be evident to those skilled in the art that valve housing 20 can also be formed in a unitary embodiment by casting and/or machining techniques.

In preferred embodiments of the present invention, passageways 50, 52, 54 and 56 are disposed within valve housing 20 such that ports 60, 62, 64 and 66 are equally spaced about valve chamber 24. Further, to provide a compact construction for valve 10 with a minimum extension along longitudinal axis 70, these ports are located so as to be coplanar with respect to each other at valve chamber 24. Thus, actuation of valve member 30 requires no axial displacement and only a minimum angle of rotation to connect the ports.

Figure 5:
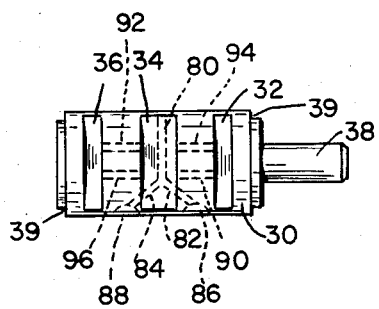
FIG. 5 shows a side plan view of the rotary valve member of the balanced four-way valve of FIG. 1.
Figure 6:
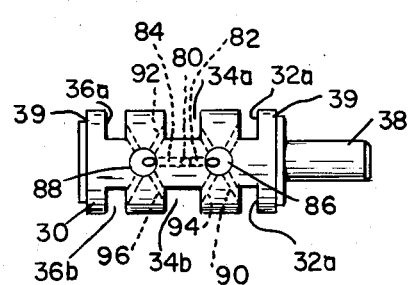
FIG. 6 shows a side plan view of the rotary valve member of FIG. 5 as rotated ninety degrees about its longitudinal axis.

Rotary valve member 30 is, for example, a cylindrical spool valve having pairs of secantial cuts 32, 34 and 36 on opposing sides at spaced locations along its longitudinal axis, as shown in FIGS. 3, 5 and 6. In preferred embodiments of the present invention, valve member 30 is sealingly fit into valve chamber 24 and secured in place by top plate 21 and bottom plate 25 at each end. Valve member 30 includes actuating rod 38 which extends through and beyond opening 29 in bottom plate 25. Rod 38 serves to rotate valve member 30 through various locations and may be directly connected to a precision stepping motor (not shown) for control of the valve position. As mounted within valve chamber 24, secantial cuts 34 are aligned and coplanar with respect to ports 60, 62, 64 and 66.

Valve member 30 is actuatable between neutral, left and right open locations (or valve positions). FIG. 1 shows a view of valve member 30 with respect to valve housing 20 at a neutral location. Secantial cuts 34a and 34b are adjacent and aligned with ports 64 and 66, respectively. Between secantial cuts 34a and 34b is a portion of valve member 30 extending the full diameter of valve member 30 and forming, on its outer surface, sealing lands 33a and 33b. In the neutral location, sealing lands 33a and 33b are aligned with and seal against ports 60 and 62, respectively. Secantial cuts 34a and 34b do not extend so far into valve member 30 so as to intersect the openings of ports 60 and 62 when valve member 30 is at this neutral location. Also, although pressure from control pressure passageways 54 and 56 can extend into valve chamber 24 to the extent of the secantial cuts, valve member 30 preferably seals against further penetration. With respect to input and output pressure from ports 60 and 62, respectively, lands 33a and 33b seal off pressure into valve chamber 24 entirely when valve member 30 is at this neutral location. Thus, a neutral location for valve member 30 is generally defined where it completely isolates pressure flow between any of the pressure lines connected to passageways 50, 52, 54 and 56.

In the preferred embodiment of FIG. 1, sealing land 33a prevents all but minimal contact between fluid from passageway 50 and valve member 30 by sealing at port 60. Such an arrangement has been found to be advantageous where high input pressures are supplied and exposure of valve member 30 to these pressures must be minimized in order to reduce wear on the valve and its sealing surfaces. Similarly, the arrangement shown of sealing land 33b with respect to port 62 is especially desirable where the return pressure line is subject to sudden high pressure surges, as where downstream hydraulic devices, possibly receiving pressure from an independent pressure source, are activated. On the other hand, where input and/or output pressures are not relatively high and/or where control pressures through passageways 54 and 56 are highly charged by, for example, an external pressure accumulator (not shown), other embodiments of the present invention define the neutral location for valve member 30 where lands 33a and 33b sealingly engage ports 64 and 66. In such embodiments, with respect to the orientation of FIG. 1, valve member 30 would be rotated approximately ninety degrees.

Secantial cuts 34a and 34b extend into valve member 30 a maximum distance $D_s$ from the circumferential edge. Such linear cuts in valve member 30 can be inexpensively machined and expose a minimum of valve member surface and sealing area to fluid pressure. The distance of $D_s$ is a function in part of the rotational angle desired for valve member 30 to move from a neutral or closed location to an open position, permitting pressure flow between pressure lines, and is selected during valve production accordingly.

Figure 7:
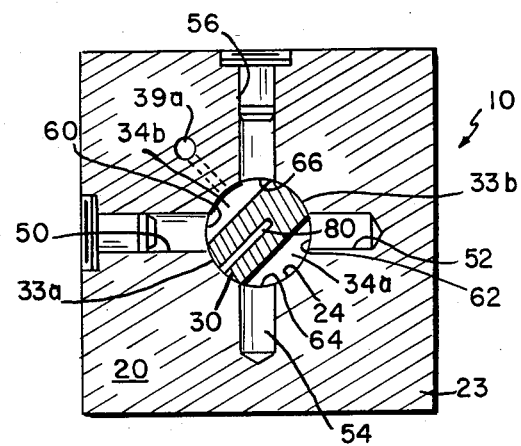
FIG. 7 shows a cross-sectional top view, corresponding to the view of FIG. 1, of a balanced four-way valve in an open position according to the principles of the present invention.

FIG. 7 shows a view of valve member 30 with respect to valve housing 20 at a "right" open location. This open location is denoted "right" since valve member 30 is rotated counterclockwise (or to the right) from the valve position shown in FIG. 1. Similarly, if valve member 30 were rotated clockwise (or to the left) from the valve position shown in FIG. 1, it would be in a "left" open location. As shown in FIG. 7, sectantial cut 34a is adjacent and aligned with both ports 62 and 64. Likewise, secantial cut 34b is adjacent and aligned with both ports 60 and 66. As a result, pressure flow is permitted between the supply input line and the control pressure line connected to passageway 56 and between the control pressure line connected to passageway 54 and the return pressure line. The portion of valve member 30 spanning between lands 33a and 33b sealingly isolates pressure flow between pressure lines not directly connected by secantial cuts 34a and 34b. In particular, pressure flow between either the supply input line or the control pressure line connected to passageway 56 and the return pressure line or the control pressure line connected to passageway 54 is not permitted at this valve position.

On the other hand, when valve member 30 is rotated to a "left" open location (not shown), secantial cut 34a is adjacent and aligned with both ports 60 and 64. Secantial cut 34b is then adjacent and aligned with both ports 62 and 66. Thus, pressure flow is permitted between the supply input line and the control pressure line connected to passageway 54 and between the control pressure line connected to passageway 56 and the return pressure line. Likewise, valve member 30 isolates pressure flow between either the supply input line or the control pressure line connected to passageway 54 and either the return pressure line or the control pressure line connected to passageway 56.

Valve member 30 can be selectively rotated through different positions at either left or right open locations, depending upon the amount and rate of fluid flow desired through secantial cuts 34a and 34b. In this respect, the desired distance to machine $D_s$ of secantial cuts 34 is in part a function of the maximum desired flow rate through those cuts. In especially preferred embodiments of the present invention, the cross-sectional area of the secantial cuts is sufficiently large so as not to constrict the fluid flow with respect to the passageways through valve body 20 when the valve is at the open position for maximum flow. Also, as will now be noted, valve member 30 need only be rotated through an angle of approximately 45° from the neutral location to connect either set of ports.

Figure 8:
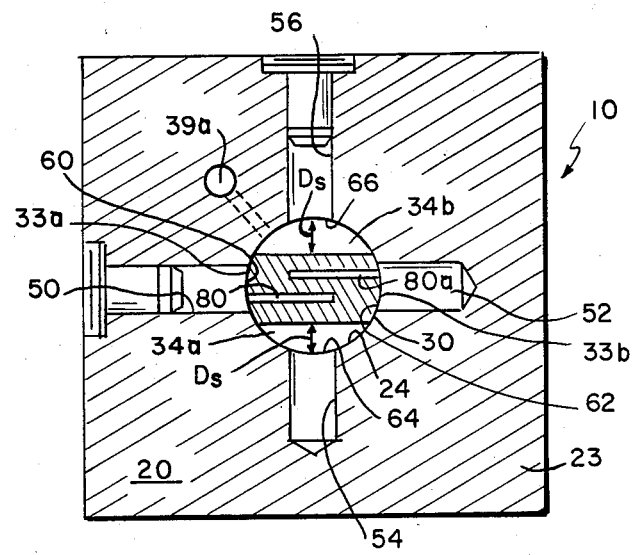
FIG. 8 shows another embodiment of the present invention with the view of FIG. 1 wherein an additional pressure equilizying channel arrangement is included.
Figure 9:
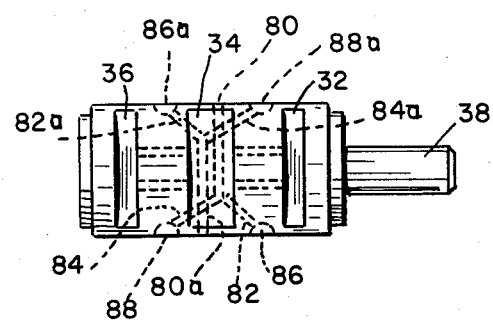
FIG. 9 shows the embodiment of FIG. 8 with the view of FIG. 5.

As discussed above, pressure imbalances from any one or more of the pressure lines can cause excess wear and/or jamming of valve member 30. To prevent this, channels are provided through valve member 30 to equalize forces on opposing sides of the valve. In particular, when valve member 30 is in a neutral location, channel 80 is provided from sealing land 33a, extending into valve member 30 and branching off into Y leg channels 82 and 84, and emerging on the opposite side of valve member 30 at recesses 86 and 88, respectively. To equalize pressure forces, for example, the area of sealing land 33a exposed to the input pressure is equal to the total area of recesses 86 and 88 exposed to that pressure and recesses 86 and 88 are equidistant on either side of an extension of channel 80 along the diameter of valve member 30 in the plane of coplanarity of ports 60, 62, 64 and 66. As shown in FIG. 8 and 9, the present invention contemplates that a similar channel arrangement (denoted by corresponding element numbers 80a-88a) will extend from sealing land 33b through valve member 30 (but not intersecting channels 80, 82 or 84) in circuits where high return pressures are expected.

Similarly, pressure imbalances from the control pressure lines when valve member 30 is in a neutral position are eliminated by providing cross channels 90 and 92 from secantial cut 34a through valve member 30 to opposing secantial cuts 32b and 36b, respectively, and by providing cross channels 94 and 96 from secantial cut 34b through valve member 30 to opposing secantial cuts 32a and 36a, respectively. These cross channels extend diagonally from secantial cut pair 34 to spaced apart secantial cut pairs 32 and 36 and are formed by linear drilling techniques (as is the Y arrangement of channels 80, 82 and 84). Again, the total areas of secantial cuts 32a and 36a exposed to control pressure from port 66 through channels 94 and 96 is preferably equal to the area of secantial cut 34b exposed to control pressure directly at port 66. Likewise, the total areas of secantial cuts 32b and 36b exposed to control pressure from port 64 through channels 90 and 92 is preferably equal to the area of secantial cut 34a exposed to control pressure directly at port 64. In this way the pressure force vectors on valve member 30 may be effectively cancelled or equalized.

While the operation and function of the pressure force balancing means of the present invention has thus far been described with respect to neutral valve positions, these features are also useful for the same purpose when the valve is in either of the open positions. Secantial cuts 34a and 34b form diagonally extending connecting paths between ports 60, 62, 64 and 66 when valve member 30 is at a left or right valve member location. As such, channels 90, 92, 94 and 96 serve to equalize pressure imbalances with respect to either pair of connected pressure lines by directing pressure to opposing secantial cuts out of the plane of those ports. Again, where secantial cut pairs 32, 34 and 36 are sealingly separated, pressure flows from each of the pressure lines or pairs of pressure lines remain isolated from the other such pressure flows. Thus, the present invention compensates for pressure line imbalances independently for each pressure line. Further, the pressure balancing channels may be used during any valve position to balance pressure forces on valve member 30 from any and all pressure lines.

To the extent that fluid leakage is permitted axially along valve member 30, undercuts 39 can be formed at each valve end. These undercuts are connected by channels 39(a) to the pressure return line D and permit fluid leakage to flow out of the valve to the pressure drain (shown schematically in FIG. 2). Thus, axial pressure imbalances on valve member 30 are avoided and complete balancing of the four-way valve is provided solely by hydraulic means.

Although the present invention has been described in terms of detailed preferred embodiments, it is to be understood that this description is to be taken by way of illustration and example only, and not by way of limitation. For example, other alternative shapes and structures are contemplated by the assembly of the present invention. Accordingly, the spirit and scope of the present invention are to be limited only by the terms of the appended claims.

What is claimed is:

1. A pressure balanced multi-way valve comprising:
   a housing having a valve chamber therein with inlet, outlet and a plurality of control passageways each connected to said valve chamber;
   a non-tapered, generally cylindrical valve means rotatably disposed in said valve chamber between open and closed positions for controlling pressure flow between each of said passageways;
   said valve means including valve passages therethrough such that upon selective rotation of said valve means to an open position said inlet passageway and one of said control passageways are connected for pressure flow therebetween and said outlet passageway and another of said control passageways are connected for pressure flow therebetween;

said valve means also including sealing land means disposed thereon such that upon selective rotation of said valve means to a closed position pressure flow between said inlet, outlet or control passageway is prevented;

balancing means operably associated with said valve means for preventing pressure in said passageways from acting on said valve means so as to restrict its actuation to said open and closed positions; and said balancing means including secantial cut-out portions and surface recess portions on said valve means and pressure flow channels extending through said valve means from said sealing land means and said valve passages to said secantial cut-out and surface recess portions surface recess portions and said secantial cut-out portions, to permit pressure exerted on said valve means at said sealing land means and said valve passages to be opposed by pressure exerted on said valve means at said secantial cut-out and surface recess portions.

2. The pressure balanced multi-way valve according to claim 1 wherein said housing includes only two of said control passageways connected to said valve chamber.

3. The pressure balanced multi-way valve according to claim 2 wherein said valve chamber is longitudinally extending within said housing and said valve means includes a generally cylindrical spool member rotatable about the longitudinal axis of said valve chamber.

4. The pressure balanced multi-way valve according to claim 3 wherein said spool member includes undercut means spaced apart along said longitudinal axis from said passageways and connected to a pressure drain means for receiving leakage and preventing the application of axial pressure imbalances on said valve means.

5. The pressure balanced multi-way valve according to claim 3 wherein said passageways are disposed so as to be coplanar with respect to each other at their connection to said valve chamber.

6. The pressure balanced multi-way valve according to claim 5 wherein said secantial cut-out and surface recess portions of said balancing means are spaced apart along said longitudinal axis of the valve chamber with respect to the plane of coplanarity of said passageways.

7. The pressure balanced multi-way valve according to claim 6 wherein said spool member includes undercut means spaced apart along said longitudinal axis from said passageways and connected to a pressure drain means for receiving leakage and preventing the application of axial pressure imbalances on said valve means.

8. The pressure balanced multi-way valve according to claim 7 wherein said valve passages are formed from secantial cut-outs on said spool member.

9. A pressure balanced four-way valve, for use in a hydraulic circuit to selectively interconnect pressure supply and return lines with control pressure lines of a hydraulic device, characterized by:

a housing having a valve chamber therein and with separate passageways therein extending from said valve chamber and adapted to be connected to each of said pressure supply, return, and control pressure lines;

a longitudinally extending, non-tapered cylindrical valve means rotatably mounted within said valve chamber and rotatably actuatable between a neutral position wherein each of said lines is isolated from the others and a first and a second connecting position wherein said pressure supply line is connected alternatively to each of said control lines while isolating said pressure supply line from the other of said lines, said valve means including primary secantial cut-out portions on the surface thereof for providing fluid pressure communication between said pressure supply line and said control lines when said valve means is in said first and second connecting positions; and balancing means for maintaining ease of actuation of said valve means within said valve chamber despite pressure imbalances asserted on said valve means by fluid pressures within said pressure supply and control lines, said balancing means including a plurality of secondary secantial cut-out portions longitudinally spaced part and on opposing sides of said valve means from each of said primary secantial cut-out portions, diagonal channel means providing fluid pressure communication between each of said primary secantial cut-out portions and their respective secondary secantial cut-out portions, recessed portions on said valve means and Y-shaped channel means providing fluid pressure communication between said pressure supply line and said recessed portions when said valve means is in said neutral position, said balancing means also maintaining the fluid pressure isolation established by said valve means in each of said valve member positions.

* * * * *

UNITED STATES PATENT AND TRADEMARK OFFICE
CERTIFICATE OF CORRECTION

PATENT NO. : 4,658,859

DATED : April 21, 1987

INVENTOR(S) : Bengt S. Backe, et al

It is certified that error appears in the above-identified patent and that said Letters Patent is hereby corrected as shown below:

Column 4, line 3, delete "wise".

Signed and Sealed this

Twenty-second Day of March, 1988

Attest:

DONALD J. QUIGG

*Attesting Officer*   *Commissioner of Patents and Trademarks*